UNITED STATES PATENT OFFICE.

WILLIAM P. TATHAM, OF PHILADELPHIA, PENNSYLVANIA, AND WILLIAM TATHAM, OF HELENA, MONTANA.

MANUFACTURE OF WHITE LEAD.

SPECIFICATION forming part of Letters Patent No. 562,437, dated June 23, 1896.

Application filed November 24, 1893. Serial No. 491,885. (No specimens.)

*To all whom it may concern:*

Be it known that we, WILLIAM P. TATHAM, of the city and county of Philadelphia and State of Pennsylvania, and WILLIAM TATHAM, of the city of Helena, Lewis and Clarke county, in the State of Montana, have invented certain new and useful Improvements in the Manufacture of White Lead, whereof the following is a specification.

We have found that if finely-powdered oxid of lead or litharge is stirred into a solution of neutral or basic acetate of lead, in proper proportions and at the proper temperature, the oxid of lead or litharge is converted into a mass composed substantially of small crystals of tribasic acetate of lead mingled with a mother-liquor containing a small quantity of tribasic and dibasic acetates of lead in solution. If the product thus obtained is then subjected to the action of carbonic acid, it is converted into a white lead of commerce of superior whiteness and body and a supernatant solution of neutral acetate of lead.

The whole operation can be performed in one vessel, but we prefer to use two vessels and proceed as follows: In the first vessel, containing the neutral acetate of lead, we stir in a quantity of unground litharge until the specific gravity indicates a solution distinctly short of saturation. The liquid is then drawn off into a second vessel and the proper amount of finely-ground litharge is gradually stirred in until crystallization sets in. The product thus obtained is a dense mass of small crystals, generally of such character as to stop the agitator, a comparatively small quantity of mother-liquor being formed, usually sufficient to merely moisten the crystals, and presents the appearance of a damp curdy mass.

We obtain the best results when the whole amount of litharge added to a neutral acetate is about two and one-fourth times as much as the oxid of lead combined with the acetic acid in the neutral solution.

When two vessels are used, we find that good results are to be obtained by dissolving about sixty per cent. of the litharge in the first vessel and the remaining forty per cent. in the second.

When one vessel is used, the temperature of the original solution should be about 80° Fahrenheit.

When two vessels are used, the temperature of the solution in the second vessel should be about 160° Fahrenheit before adding the litharge.

We have also found that better results are obtained by having the strength of the original solution, where the litharge is all put in at once, about sixteen per cent. of acetate of lead, and in the second case, where the powdered litharge is added to the partially-saturated solution, the strength of the original neutral solution need only be about thirteen per cent. of acetate of lead.

The next step in the process consists in exposing the crystallized tribasic acetate, together with the mother-liquor itself, to the action of carbonic acid, preferably, though not necessarily, in the same vessel in which crystallization is accomplished. When this exposure to the action of carbonic acid has continued for a sufficient time, the mass is converted into white lead and neutral acetate of lead in solution. The neutral acetate of lead is separated by filtering, or by any other suitable method, and is used over again with a fresh portion of litharge, while the white lead is washed and dried.

We do not say that it is necessary for the production of white lead that the mother-liquor should be exposed to the action of the acid. It is difficult and expensive, however, to separate it from the crystals, and therefore more economical to allow the whole product, both crystals and uncrystallized liquor, to be exposed to the action of the carbonic acid.

We are aware that it is not new to subject a solution of basic acetate of lead to the action of carbonic acid gas, and we do not claim such process. It differs primarily from our process in the fact that the tribasic acetate of lead which we use is subjected, in solid form, to the action of the carbonic acid. By this means we are enabled to greatly reduce what may be termed the "idle percentage of lead," when the process is used as a continuous one by the repeated saturation of the final mother-liquor after the conclusion of exposure to the gas. Thus in our process practically all of the litharge which is added at the first stage of the process is converted into white lead, whereas in such a liquid process as is set forth in the patent to A. C. Bradley, No. 434,623, dated August 18, 1890, the patentee states that only about one-half of the charge of basic acetate is converted into white lead. The lack of economy in such method, when the process is conducted upon a large scale, is obvious.

Having thus described our invention, we claim—

1. The hereinbefore-described process of manufacturing white lead, which consists in adding litharge to a solution of acetate of lead until a mass of crystals of tribasic acetate of lead has been formed, and then exposing said mass to the action of carbonic-acid gas, substantially as and for the purposes specified.

2. The hereinbefore-described process of manufacturing white lead, which consists in exposing crystallized tribasic acetate of lead to the action of carbonic-acid gas, substantially as set forth.

WILLIAM P. TATHAM.
WILLIAM TATHAM.

Witnesses:
JAMES H. BELL,
G. HERBERT JENKINS.